United States Patent [19]

McBride

[11] 4,078,823
[45] Mar. 14, 1978

[54] VERTICALLY ADJUSTABLE TRAILER HITCH

[76] Inventor: Charles H. McBride, Rte. 4, Box 1620, Gresham, Oreg. 97030

[21] Appl. No.: 747,965

[22] Filed: Dec. 6, 1976

[51] Int. Cl.² ............................................. B60D 1/06
[52] U.S. Cl. ................................ 280/490 R; 172/680; 403/4
[58] Field of Search .............. 280/490 R, 490 A, 511, 280/512, 513, 500, 502, 504, 415 R, 415 A, 405 R; 172/680; 403/3, 4, 76, 122

[56] References Cited

U.S. PATENT DOCUMENTS

| 2,104,734 | 1/1938 | Carpenter | 280/490 R |
| 2,175,427 | 10/1939 | Carmody et al. | 280/490 R |
| 3,655,221 | 4/1972 | Warner | 280/490 R |
| 4,008,905 | 2/1977 | Soteropulos et al. | 403/3 |

Primary Examiner—Joseph F. Peters, Jr.
Assistant Examiner—John A. Pekar
Attorney, Agent, or Firm—Eugene D. Farley

[57] ABSTRACT

A vertically adjustable hitch for securing the drawbar of a towing vehicle to the tongue of a trailer in relative positions of vertical alignment comprises first and second interlocking members and first and second mounting means mounting the interlocking members one on the drawbar and the other on the tongue. One of the mounting means comprises a retainer receiving a plurality of pads adjustably mounted in interchangeable vertical relation. One of the pads extends outwardly from the others and mounts one of the interlocking members. A fastener releasably fastens the pads in the retainer in the selected relative positions of vertical adjustment, thereby aligning vertically the two interlocking members.

2 Claims, 3 Drawing Figures

VERTICALLY ADJUSTABLE TRAILER HITCH

BACKGROUND AND GENERAL STATEMENT OF THE INVENTION

This invention pertains to trailer hitches. When towing a trailer behind a vehicle, for example a house or boat trailer behind an automobile or truck, the driver is confronted with the common problem of vertical misalignment of the component members of the trailer hitch. The elevations of these two members relative to each other is determined by such factors as the loads carried in the towing vehicle and trailer; the position of the load in the trailer; the frame dimensions of the particular trailer employed; the particular tires used on the towing vehicle and trailer; and the amount of air in the tires. As a result of these variables, the relative heights of the hitch components is never the same and it is necessary to lift or depress the trailer tongue in order to bring the hitch components together and lock the one to the other. Where the loads are heavy, this is difficult to do and may result in injury to the driver.

It accordingly is the general object of the present invention to provide a vertically adjustable trailer hitch which makes possible vertical alignment of the hitch components for each coupling of the same.

Still other objects of the present invention are the provision of a vertically adjustable trailer hitch which is adaptable to use with a variety of classes of hitches; which is easy to use; which provides a plurality of stages of vertical adjustment; which is safe to use; and which is simple in construction, strong, and substantially maintenance free.

The foregoing and other objects of the present invention are accomplished by the provision of a trailer hitch which, broadly considered, comprises first and second interlocking members and first and second mounting means mounting the interlocking members one on the towing vehicle and the other on the trailer. Preferably the interlocking members comprise a ball and socket mounted respectively on the drawbar of the truck and the tongue of the trailer.

One of the mounting means, preferably that mounting the ball on the drawbar of the towing vehicle, comprises a retainer and a plurality of pads adjustably mounted in interchangeable vertical relation in the retainer. One of the pads extends outwardly from the other and mounts the interlocking member. Fastening means releasably fasten the pads in the retainer in selected relative positions of vertical adjustment.

In a preferred embodiment the retainer comprises a clevis or C-shape retainer receiving the pads and the fastening means comprises one or more bolts penetrating the clevis and pads.

DESCRIPTION OF THE PREFERRED EMBODIMENT IN THE INVENTION

The vertically adjustable trailer hitch of my invention is described and illustrated on the accompanying drawings wherein.

Figure 3:
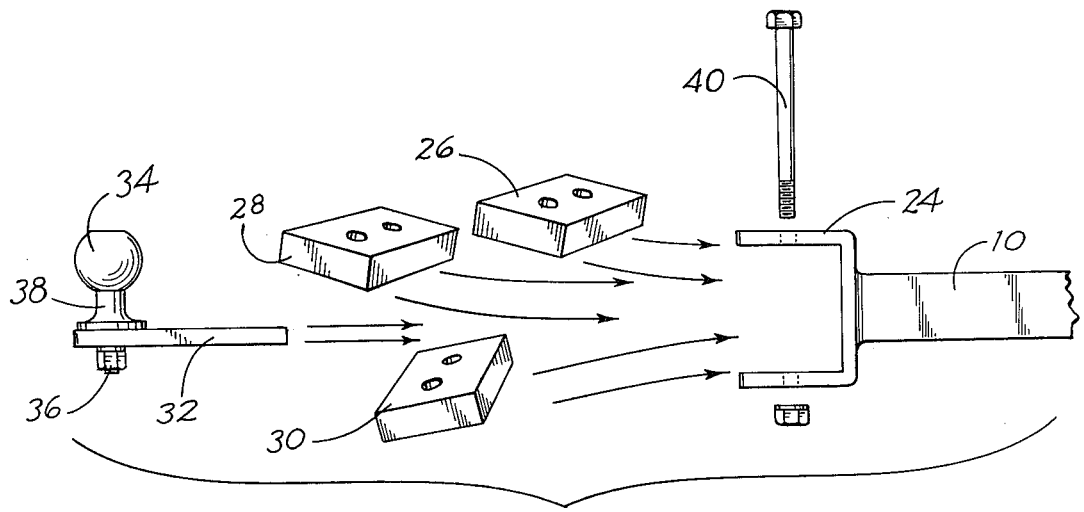
FIG. 3 is a top perspective exploded view of one of the components of the hitch.
Figure 2:
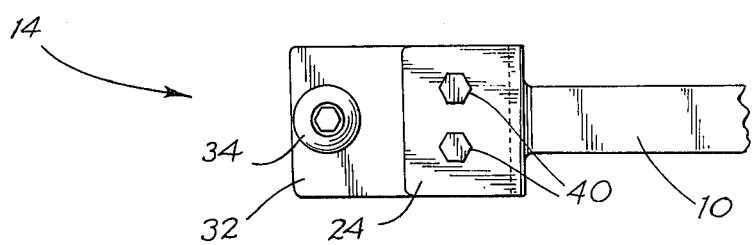
FIG. 1 is a fragmentary view in elevation illustrating the components of the hitch as they are mounted on the towing vehicle and trailer respectively and FIG. 2 is a fragmentary top plan view further illustrating the construction of the adjustable component of the hitch.
Figure 1:
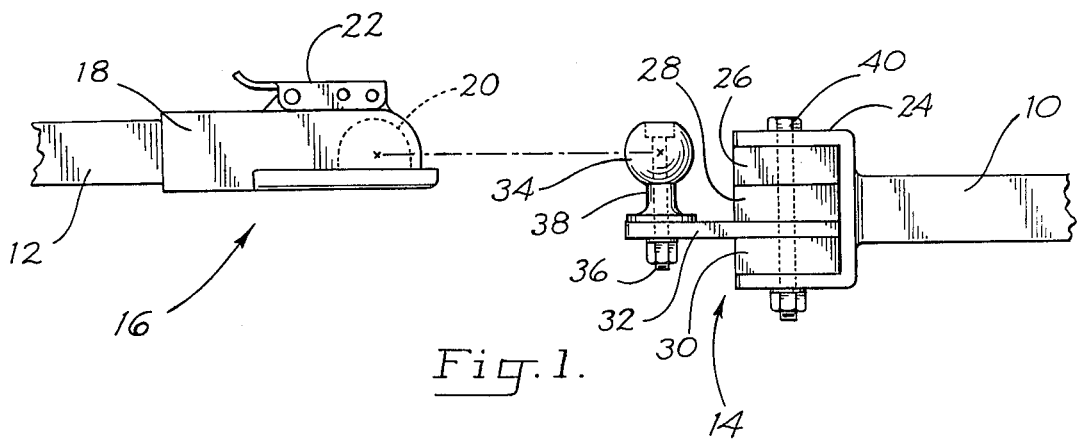

As illustrated in FIG. 1, the vertically adjustable trailer hitch of my invention comprises two interlocking members one of which is adapted to be mounted on the drawbar 10 of the automobile, tractor, or other vehicle, and the other of which is adapted to be mounted on the tongue 12 of a trailer. The hitch is particularly well suited for use with conventional house trailer or boat trailer assemblies, but may be employed with equal benefit to heavy duty insulations.

Although not particularly limited thereto, the hitch of my invention is described herein with reference to a hitch comprising interlocking ball and socket members such as are widely used in trailer towing practice. It accordingly is illustrated with reference to a ball component 14 and a socket component 16.

The socket component 16 of the hitch is conventional in construction. It comprises a case 18 housing a socket 20 and including a lock 22.

The ball component of the assembly includes a retainer 24 which is welded to drawbar 10 and which preferably comprises a clevis or C-shaped member having vertically spaced, perforated side plates. The clevis is disposed horizontally, i.e. with its open end trailing, or facing rearwardly.

Retainer 24 houses a plurality of pads 26, 28, 30, 32 all of which are perforated centrally, the perforations in the pads being aligned with the perforations in the side plates of the retainer when the pads are positioned within the retainer.

The pads are of two categories.

The first category, comprising pads 26, 28, 30, are substantially codimensional with the clevis, are interchangeably mounted within the clevis, and serve as filler pads completely filling the space within the clevis.

The second category, comprising pad 32, serves the dual function of a filler pad and a support for the ball component of the hitch. It comprises a flat bar preferably having the same width as pads 26, 28, 30 but having a greater length.

As seen particularly in FIG. 1, pad 32 extends rearwardly from the clevis in substantially axial alignment with drawbar 10. It mounts the ball component 34 of the hitch by means of bolt 36 and spacer 38.

Fastening means releasably fasten all of the pads within retainer 24 in selected relative positions of vertical adjustment.

The fastening means employed for this purpose comprise one or more bolts 40 which penetrate all of the perforations in the pads and clevis side walls.

OPERATION

In the use of the presently described vertically adjustable trailer hitch the two components of the hitch are placed in proximity to each other by the usual maneuvering of the towing vehicle. The relative vertical position of the two components of the hitch is appraised by the operator. If they are not closely vertically aligned, he disassembles ball component 14 of the hitch by removing bolts 40. He then reassembles filler pads 26, 28, 30 and ball support pad 32 in an arrangement or stack which will position ball support pad 32 with ball 34 on substantially the same horizontal plane as socket 20. He then replaces the stack in retainer 24 and secures its components in their new arrangement by means of bolt 40.

In this manner the elevation of ball component 34 of the hitch may be readily adjusted from time to time to match the elevation of the companion socket member, making it a comparatively easy task to place the latter over the former preparatory to towing the trailer.

Having thus described my invention in preferred embodiments, I claim:

1. A vertically adjustable trailer hitch comprising:
   (a) ball and socket interlocking members
   (b) first mounting means mounting the ball on a drawbar of a towing vehicle,
   (c) second mounting means mounting the socket on a tongue of a towed vehicle,
   (d) the first mounting means comprising
      (1) a horizontally arranged clevis having its trailing end open and its side members perforated and vertically spaced,
      (2) a plurality of centrally perforated pads received in the clevis in adjustably interchangeable vertical relation,
      (3) one of the pads extending rearwardly in substantially axial alignment with the vehicle drawbar and mounting the ball,
      (4) and bolts means penetrating the perforation in the clevis side members and pads for releasably fastening the pads in the clevis in selected relative positions of vertical adjustment.

2. A vertical adjustable trailer hitch comprising:
   (a) first and second interlocking trailer hitch members,
   (b) first mounting means mounting one of the first and second interlocking trailer hitch members on a drawbar of a towing vehicle,
   (c) second mounting means mounting the other of said first and second interlocking trailer hitch members on a tongue of a towed vehicle,
   (d) the first mounting means comprising:
      (1) a horizontally arranged clevis having its trailing end open and its side members perforated and vertically spaced,
      (2) a plurality of centrally perforated pads received in the clevis in adjustably interchangeable vertical relation,
      (3) one of the pads extending rearwardly in substantially axial alignment with the vehicle drawbar and mounting said one of the first and second interlocking trailer hitch members,
      (4) and bolt means penetrating the perforation in the clevis side members and pads for releasably fastening the pads in the clevis in selected relative positions of vertical adjustment.

* * * * *